United States Patent Office 3,208,523
Patented Sept. 28, 1965

3,208,523
METHOD OF RECOVERING LOST CIRCULATION IN DRILLING WELLS AND FLUID THEREFOR
Arthur I. Coyle, Houston, Tex., and Edgar W. Sawyer, Jr., Metuchen, N.J., assignors to Minerals & Chemicals Philipp Corporation, Menlo Park, N.J., a corporation of Maryland
No Drawing. Filed Mar. 1, 1962, Ser. No. 176,781
14 Claims. (Cl. 166—29)

This invention relates to a novel composition for recovering lost circulation in drilling wells and to the method for using the same.

Circulation of drilling fluid is frequently interrupted or curtailed during the rotary drilling of gas and oil wells when the drilling fluid is lost to the formation through which the bore hole passes. The cause may be the traversal of a porous formation, fissured formation or lifting of overburden. Lost circulation is always a serious problem when it occurs and may result in loss and sealing off of the formation or it may result in freezing of the drill bit due to the accumulation of cuttings in the well hole. When the area of the fissure or interstice in the formation causing the lost circulation is sufficiently small, the usual method for recovering circulation is to incorporate into the existing drilling fluid or mud a multiplicity of granular, fibrous or lamellated particles. These particles, called "sealing agents" to distinguish them from cementing agents which set into strong solids, are carried by the drilling fluid and follow the path of lost circulation. When the fluid reaches the fissured or porous area, the particles deposit on the face of the fissures or pores, forming a matted or wadded seal. Since drilling fluids are made up to have low water loss properties, usually less than 25 cc./30 min. (by the API filtration test hereafter described), the deposition of the particulate sealing agents to form a seal or plug on the wall is accomplished with little water loss.

This general method for recovering lost circulation which depends merely upon suspending a suitable sealing agent into the existing drilling fluid, leaves much to be desired in that the seals deposited in this manner are usually relatively thin and are frequently washed further into interstices of the formation when drilling operations are resumed.

To overcome the aforementioned limitation to the use of sealing agents to correct lost circulation in producing wells, it has been suggested to recover lost circulation by stopping the circulation of the drilling fluid and introducing into the well a suspension of sealing agent in a water dispersion of attapulgite clay. Aqueous dispersions of this type of clay have high water loss properties in the absence of water loss reducing agents and, when introduced into the well with suspended sealing agent, they form a thicker sealing cake than would be obtained using a conventional mud having low water loss properties. The suspension of sealing agent in water dispersed attapulgite clay is maintained in the formation under pressure until the liquid phase of the composition seeps through the formation, leaving a dense water permeable cake as a base for the water-impermeable mud sheath subsequently formed upon recirculation of the drilling fluid through the drill pipe. While thicker cakes which resist washing can be built up in this way, the time required is relatively long, typically at least 12 hours. Shutdown of the drilling operation for such a prolonged time is very costly and undesirable.

This invention is a result of our discovery that the high water loss rates of aqueous colloidal attapulgite clay dispersions can be increased to unexpectedly high levels without impairing the suspending powers of the dispersions by the addition thereto of a combination of additives, hereafter described, which cooperatively reduce the residence time required to correct lost circulation in a well by means of an aqueous dispersion of colloidal attapulgite clay. In other words, the improved lost circulation recovery compositions of this invention utilize and augment the high water loss characteristics of attapulgite clay dispersions. This characteristic is usually considered undesirable in rotary drilling muds and generally necessitates the use of water loss reducing additives, such as sodium carboxymethylcellulose or starch, in attapulgite clay rotary drilling muds.

Accordingly, a principal object of this invention is the provision of an improved method for recovering lost circulation in the rotary drilling of oil and gas wells.

A more particular object of this invention is to provide an improved method for the recovery of lost circulation in a well by means of a thick plug or seal that is formed by a fluid having higher water loss properties than compositions heretofore suggested for the purpose, whereby lost circulation can be corrected in a shorter period of time than was possible with prior compositions.

A further object is the provision of a dry mixture which when dispersed in water and incorporated with conventional sealing particles (such as aspen fibers) corrects lost circulation in a very rapid and expeditious manner.

Another object of this invention is the provision of a novel pumpable aqueous suspension characterized by extremely high water loss properties and useful in rapidly recovering lost circulation in a well.

Still another object is the provision of a clay composition which has extremely high water loss properties coupled with excellent suspending powers in aqueous vehicles, even in the presence of salts.

Stated briefly, in accordance with this invention, the usefulness of colloidal attapulgite clay as an agent to rectify lost circulation is improved by employing with said clay the combination of a material selected from the group consisting of hydratable MgO and Mg(OH)$_2$ and an inorganic filter aid powder (e.g., diatomaceous earth). When the magnesia and filter aid powder are present with attapulgite clay they increase the water loss of attapulgite clay dispersions to a degree which cannot be achieved with either additive employed singly with the attapulgite clay. Therefore, the use of the combination of additives with attapulgite clay brings about an outstanding reduction in the time required to recover lost circulation with aqueous attapulgite clay dispersions, a result which cannot be realized with the individual additives.

The clay, MgO and filter aid are incorporated with water together with conventional sealing material and, in some cases, a weighting agent such as barites, to form a thick yet pumpable aqueous fluid. One hundred barrels or more of this composition, hereafter called a "pill," is pumped into the faulty zone in a well and circulation and drilling is stopped. The pill is squeezed into the faulty zone, rapidly forming a water-permeable dense cake covering the faulty zone and preventing further fluid loss. Upon recirculation of the conventional drilling fluid, a water-impermeable mud sheath is formed on the face of the cake, whereby further water loss is prevented.

The use of attapulgite clay as the suspending agent in the lost circulation recovering composition is an essential feature of this invention. Other colloidal clays used in making up drilling fluids will not suffice in making up the pill. Hydratable clay (i.e., swelling bentonite) such as Wyoming bentonite should be substantially absent from the lost circulation recovery fluid of this invention since any swelling clay present therein tends to impair the rapid water loss of the fluid and thereby adversely effects the thickness of the cake obtained by filtration of the liquid phase of the pill through the deposited solids. Water loss reducing agents, normally employed in making up attapulgite clay rotary drilling muds, should also be absent from the attapulgite clay compositions of this invention.

This invention is put into practice when a drill pipe has passed through a fissured formation in a well (or other faulty zone) and some of the conventional rotary drilling fluid, composition No. 1, has escaped after being used to drill through an upper section of the well, depositing a mud sheath on the upper section of the well. After stopping the rotation of the bit carried by the drill pipe and cutting off circulation of composition No. 1, composition No. 2 (the lost circulation recovery pill of this invention) is pumped into the well through the drill pipe. Composition No. 2 is more dense than composition No. 1 and substantially displaces the rotary drilling fluid at the lower portion of the well, covering the fissured formation. Composition No. 2 is left in the well under pressure, either mechanical applied pressure or, when the fissured formation is sufficiently deep, by the hydrostatic head. During its residence in the well, composition No. 2 is maintained quiescent, that is, the pill is not circulated and the drill bit is stationary. Composition No. 2 is maintained in the well for a time sufficient for substantially all of its aqueous phase to flow outwardly into the fissure, simultaneously depositing a caked mat or wadding over the face of the fissure through which the liquid filters. As the water in composition No. 2 seeps through the cake, the level of composition No. 1 is lowered in the well. The residence time of the pill in the well may be from about 1 to 10 hours, depending on the pressure on the fluid. Circulation of composition No. 1 (or other low water loss circulating fluid) is resumed after the caked mat or wadding is formed from the ingredients of the pill. The mud sheath formed by recirculated drilling fluid accumulates over the face of the cake formed by the pill and water loss through the seal ceases.

COMPOSITION NO. 1

Fluid No. 1, the conventional low water loss mud, can be made up with hydratable (expanding-type) bentonite, e.g., Wyoming bentonite, together with conventional weighting agents, thinners, other stabilizing agents and perhaps water loss inhibitors. Fluid No. 1 may also be made up with salt water drilling clay (attapulgite), weighting agents, thinners and water loss reducing agents.

COMPOSITION NO. 2

A colloidal grade of attapulgite clay is used as the suspending agent for the solid ingredients in the composition. By colloidal grade of attapulgite clay is meant attapulgite clay which has never been dried to a volatile matter (V.M.) less than about 12%, and preferably clay which has never been dried to a V.M. less than about 18%. Volatile matter is determined by heating the clay to essentially constant weight at 1800° F. Clay having a V.M. within the range of about 20% to 25% is especially suitable. The particle size of the clay before dispersion in the aqueous liquid can be the same that is used in making up rotary muds, e.g., particles 200 mesh (Tyler) or finer.

The $Mg(OH)_2$ or hydrated MgO is employed in finely divided form, e.g., particles 325 mesh (Tyler) or finer. The hydratable MgO we use may be prepared by calcining (burning) magnesite ($MgCO_3$), magnesium hydroxide or magnesium basic carbonate in the temperature range between about 400° C. and about 900° C. A suitable commercial grade of hydratable magnesium oxide is the so-called "caustic-burned magnesia." So-called "dead-burned magnesia" is not suitable for the purposes of this invention. Magnesium hydroxide and hydratable oxide from sea water and brines may be used. Brucite, a naturally occurring fibrous form of $Mg(OH)_2$ should also be satisfactory.

The preferred filter aid material is a filter aid grade of diatomaceous earth, especially a flux calcined grade. Good results have also been obtained with a filter aid material obtained from colloidal attapulgite clay which has previously been dispersed in water in the presence of a deflocculating agent, quiescently dried (i.e., without substantial boiling and without agitation) and then been calcined. The method for producing the latter material, which has the form of predominantly microscopic distinctly elongated particles, is described in copending U.S. patent application, Serial No. 84,774, filed January 25, 1961, now U.S. 3,080,214, by J. B. Duke et al. It is reasonable to expect that heat-expanded perlite, another siliceous filter aid material can also be used. The filter aid material is employed as a powder consisting of particles which are substantially all minus 325 mesh (Tyler series). Mixtures of the aforementioned siliceous filter aid materials can be employed.

The sealing agent employed in carrying out this invention consists of water-insoluble particles which are capable of being suspended in water to form a composition which can be circulated by rig pumps. The nature of the particles is such that when they are deposited from suspension, the particles overlap or intertwine to form a water-permeable noncementitious plug. The material can be granular, e.g., nut shells, exfoliated perlite, and cottonseed hulls; lamellated such as cellophane flakes; or fibrous such as sawdust, bark, hay or shredded wood. Sealing agents are in most cases highly bulky materials. Representative of some other materials which can be used as the sealing agent are cottonseed hull, aspen fiber, granular plastics, nut hulls, mica, cellulose flakes, moss, chicken feathers, shredded paper, asbestos, textile fibers, vermiculite, rock, leather, sponge, sugar cane fibers, wheat bran and flaxseed. The choice of sealing agent will depend on the size of the slot to be sealed and by availability.

The liquid used in making up composition No. 2 may be water although excellent results can be obtained with saturated NaCl water, aqueous solutions of $MgCl_2$, $MgSO_4$, salt saturated gyp, and salt contaminated water. Using saturated salt water in making up the pill, about twice is much filter aid material will be needed to give the same water loss rate obtained with a pill made up with fresh water.

The proportion of ingredients in the pill are as follows:

| | Pounds/barrel |
|---|---|
| Attapulgite clay | 6 to 15 ("as is" clay weight basis). |
| MgO or $Mg(OH)_2$ | 1% to 5% (based on clay weight, 20% V.M. clay basis)*. |
| Powdered filter aid (diatomaceous earth, expanded perlite or predispersed calcined attapulgite clay) | 6 to 18. |
| Weighting agent (e.g., barite) | 0 to 800. |
| Sealing agent (e.g., organic fiber) | 2 to 40. |

*Expressed on 20% V.M. clay basis to account for variation in V.M. of colloidal attapulgite clay. Thus, to add 2.0% MgO to attapulgite clay having a V.M. of 30%, 1.75 parts of MgO are added to 100 parts of "as is" clay.

The quantity of sealing agent used will vary with the nature of the sealing agent, as is known to those skilled in the art, and is restricted by the necessity for providing a pumpable suspension. The sealing agent toughens the cake formed by the attapulgite clay and filter aid material. As is the case of making rotary drilling fluids, the amount of weighting agent in the pill will increase with the depth and pressure of the formation into which the pill is incorporated.

When the MgO is employed in amount less than about 1% of the clay weight or in amount in excess of about 5% of the clay weight, it tends to lose its effectiveness in increasing the water loss rate of the attapulgite clay.

We are aware that diatomaceous earth has been suggested in the prior art as an ingredient of compositions for recovering lost circulation in wells. Thus, for example, in accordance with the teachings of U.S. 2,683,690 to Armentrout, diatomaceous earth (or equivalent finely divided expanded perlite) is employed in combination with coarse particles of expanded perlite and granules of swelling bentonite clay to recover lost circulation. When an aqueous mixture of these materials is pumped into the well in which circulation is being lost, the bentonite expands in situ as a result of water absorption, thereby locking the other solids in place to form an impervious seal which prevents further loss of circulation upon resumption of drilling. In contrast with the Armentrout seal which is impervious and utilizes hydratable bentonite, a very low water loss clay, the cake formed in accordance with this invention is highly pervious and this result is obtained using attapulgite clay, a high water loss clay. Yet another patent which teaches the use of diatomaceous earth in recovering lost circulation is U.S. 2,626,779, also to Armentrout. This patent has to do with recovering lost circulation in a productive strata by first discharging a substantial batch of screened sand and gravel into the circulating fluid which follows the source of lost circulation and deposits a layer of sand and gravel thereon. Thereafter diatomaceous earth or perlite baghouse fines is incorporated into the circulating fluid and is deposited on the sand or gravel to form a filter cake which acts as a foundation on which a sheath is deposited by the drilling fluid. In contrast with the sealing method of the second-mentioned Armentrout patent which entails a plurality of separate additions of materials to achieve a porous seal, the porous seal is achieved by a single step in carrying out this invention. Moreover, Armentrout utilizes the regular circulating fluid for conveying his sealing agents while we employ a specially formulated high fluid loss vehicle.

The following examples are given to contribute to a more complete understanding of this invention. In the examples water loss properties are determined by the filtration procedure described in Section IV API RP 29, Third Edition, May 1950, issued by American Petroleum Institute, Division of Production, Dallas, Texas. Pressure in the test was applied by nitrogen. The term "blew dry," employed in describing results of the test with compositions having extremely high filtration rates, refers to the condition after application of pressure by the nitrogen gas (and before the expiration of the 30 minutes filtration test time) such that all liquid had filtered through the test press and nitrogen gas began to issue through the filter cake.

*Example I*

A lost circulating mud additive was prepared in accordance with this invention by dry mixing the following:

| | Wt. percent |
|---|---|
| Attapulgus 150 drilling mud clay (a commercial colloidal attapulgite clay having an API fresh water yield of about 150 bbl./ton; V.M. about 20% as produced) | 43.86 |
| MgO (hydratable grade) | 1.32 |
| Hyflo Supercel (flux-calcined grade of diatomaceous earth, 100% minus 325 mesh) | 54.82 |
| | 100.00 |

(a) This mixture was made up into a mud having a Fann apparent viscosity of 12.1 cp. by agitating the mixture in fresh water in amount of 18 lbs./bbl. (about 8 lbs./bbl. attapulgite clay plus MgO and 10 lbs./bbl. diatomaceous earth). The API water loss of the composition was 240 cc. and it blew dry in 9 minutes, as compared with (1) an API water loss of only 172 cc./30 minutes (without blowing dry) for a 12.0 cp. mud made up with the attapulgite drilling clay only and (2) a water loss of 263 cc. (blowing dry in 27 minutes) for a 11.6 cp. mud made up with the attapulgite clay plus 3% MgO without diatomaceous earth. The API water loss of a 12.6 cp. mud containing 10 lbs./bbl. of the clay with no magnesia additive and 10 lbs./bbl. of the diatomaceous filter aid was 224 cc. and it blew dry in 19 minutes, somewhat more than double the time required for the clay mixture containing magnesia plus filter aid to blow dry.

The results therefore show that an exceptionally rapid filtration was obtained with a pill containing attapulgite clay, MgO and diatomaceous earth and that the rate of filtration obtained with the three ingredients was not achieved with attapulgite clay alone or with attapulgite clay and either diatomaceous earth or MgO employed singly.

In saturated salt water the water loss (API methods) of a 12.5 cp. mud containing 18 lbs./bbl. of the mixture of attapulgite clay, MgO diatomaceous earth was 288 cc. and it blew dry in 21 minutes, as compared with a water loss of only 184 cc./30 minutes for the 11.5 cp. salt water mud made up with 10 lbs./bbl. of the attapulgite clay containing 3% by weight of the MgO. The water loss of a saturated salt water mud made up with attapulgite clay to an apparent viscosity of 12.5 cp. was only 183 cc./30 minutes.

In fresh water containing 6 lbs./bbl. gyp, the API water loss of the 12.1 cp. mud made up with the attapulgite clay, MgO and filter aid was 270 cc. (blowing dry in 13 minutes). On the other hand, the water loss of a 12.0 cp. gyp mud made up with the attapulgite clay only was 175 cc./30 minutes.

(b) To a portion of the fresh water mud made up with 18 lbs./bbl. of the mixture of clay, MgO and diatomaceous earth, there was added with mild agitation:

| | Lbs./bbl. |
|---|---|
| Barites | 680 |
| Aspen fiber | 15 |

This resulted in a stable, viscous mixture in which the barites did not settle and the fiber did not float off 24 hours after preparation. The API water loss of the aqueous mixture was 220 cc. and it blew dry in only 15 minutes.

*Example II*

Experiments were carried out to demonstrate the improvement in filtration properties in fresh and salt water systems that is obtained by incorporating a diatomaceous filter aid into an aqueous suspension of colloidal attapulgite clay containing hydratable MgO additive and sealing matter. Similar experiments were conducted substituting a sodium (Wyoming) bentonite for the attapulgite clay to demonstrate that the hydratable bentonite, even with addition of diatomaceous filter aid, is not useful as the clay ingredient in making up high water loss sealing compositions in either salt or fresh water.

Formulations identified in the accompanying table were made up in a Hamilton Beach mixer with 30 minutes stirring to disperse the clay and barites. Aspen fiber was added with a few more seconds of stirring. The formulations were evaluated for stability of suspension and subjected to the API filtration test (RP 29) to determine the rate of water loss of each formulation and thickness of the resultant filter cake. Composition of each formulation and results are summarized in the accompanying table.

The tabulated data show that the presence of diatomaceous earth particles with MgO treated attapulgite clay in both fresh water and salt water systems (Samples No. 2 and 6, respectively) resulted in each case in a marked improvement in filter cake thickness over Samples No. 1 and 5 which did not contain filter aid. The increase in filtration rate as a result of the presence of diatomaceous earth was especially noteworthy in the fresh water system in which Sample No. 2 (containing filter aid plus MgO and attapulgite) blew dry in only 15 minutes during the API filtration test. Suspension of barites and aspen was satisfactory in all attapulgite systems.

TABLE.—EFFECT OF CLAY SPECIES AND ADDITIVES ON WATER LOSS PROPERTIES OF SUSPENSIONS OF WEIGHTING AND SEALING AGENTS

| Sample No | 1 | 2 | 3 | 4 | 5 | 6 | 7 | 8 |
|---|---|---|---|---|---|---|---|---|
| Water (fresh) | 350 cc | 350 cc | 350 cc | 350 cc | | | | |
| Saturated NaCl solution | | | | | 350 cc | 350 cc | 350 cc | 350 cc. |
| Barites | 680 g | 680 g | 680 g | 680 g | 680 g | 680 g | 680 g | 680 g. |
| Aspen fiber | 15 g | 15 g | 15 g | 15 g | 15 g | 15 g | 15 g | 15 g. |
| Attapulgite+3% MgO | 10 g | 10 g | | | 10 g | 10 g | | |
| Bentonite | | | 15 g | 15 g | | | 15 g | 15 g. |
| HiFlo Supercel | | 10 g | | 15 g | | 10 g | | 15 g. |
| Mud weight | 18.0 #/gal | 18.5 #/gal | 18.5 #/gal | 18.5 #/gal | 18.0 #/gal | 18.5 #/gal | 18.5 #/gal | 18.7 #/gal. |
| API water loss, cc./30 min | BD [1] 25 min | BD [1] 15 min | 15 cc | 21 cc | BD [1] 27 min | BD [1] 26 min | 180 cc | 190 cc. |
| Cake thickness | 1.5″ | 2.0″ | 0.25″ | 0.30″ | 1.5″ | 1.75″ | 0.30″ | 0.40″. |
| Stability | Good | Good | Good | Good | Good | Good | Poor, barites settled. | Poor, barites settled. |

[1] BD=blew dry.

In contrast with compositions of the present invention (Samples No. 2 and 6) which produced filter cakes 1.75 and 2 inches thick, the thickest filter cake obtained with compositions made up with bentonite was only 0.40 inch thick (Sample No. 7) and this result was obtained in a salt water system in which the clay had inadequate suspending properties. Whereas compositions of this invention had extremely rapid filtration rates, blowing dry before the expiration of the 30 minute test period, the filtration rate of the stable bentonite systems (Samples No. 3 and 4 made up with fresh water) were extremely low even when diatomaceous earth was present. While the water loss rate of the bentonite compositions in salt water were improved over the water loss rate of the bentonite compositions in fresh water, this result was obtained by flocculation of the clay, with accompanying loss of suspending power. Moreover, the water loss rates obtained with bentonite in salt water were very low as compared with the water loss rates of compositions of the present invention.

*Example III*

This example illustrates the use, in a lost circulation recovery composition of this invention, of a filtration additive obtained from predispersed attapulgite clay (referred to hereafter as "attapulgite filter aid" to distinguish it from the colloidal attapulgite clay used as the suspending agent in the pill composition).

The filter aid was obtained by dispersing colloidal attapulgite clay in water containing about 2.5% tetrasodium pyrophosphate, based on the volatile free clay weight. The attapulgite clay dispersion was air-dried without agitation and without boiling, crushed and milled, and the minus 200 mesh material calcined at about 1750° F. to a V.M. of about 0. The attapulgite clay filter aid material, consisting for the most part of microscopic elongated particles, was dry mixed with Attapulgus 150 Drilling Mud Clay which had previously been thoroughly dry mixed with 3% by weight of hydratable MgO. The mixture was agitated in water to form a 12.3 cp. (Fann) mud containing 8 lbs./bbl. of Attapulgus 150 Drilling Mud Clay containing 3% MgO and 10 lbs./bbl. of the attapulgite filter aid. The mud was subjected to the API filtration test and found to blow dry after only 16 minutes with a water loss of 244 cc. Twenty-seven minutes were required for a control mud containing 10 lbs./bbl. of the attapulgite clay containing 3% MgO and no filter aid to blow dry. In the absence of MgO, an 11.1 cp. mud containing 10 lbs./bbl. of the attapulgite clay and 6 lbs./bbl. of the attapulgite filter aid required 28 minutes to blow dry, giving a water loss of 220 cc.

We claim:

1. A composition for use in recovering lost circulation in drilling wells comprising a dry mixture adapted to be mixed with water and well sealing materials to form a mixture having a high water loss value, said dry mixture consisting essentially of, colloidal attapulgite clay, a small percentage, based on the weight of said clay, of a material selected from the group consisting of hydratable MgO and Mg(OH)$_2$, and minus 325 mesh particles of a filter aid material.

2. A composition for use in recovering lost circulation in drilling wells comprising a dry mixture adapted to be mixed with water and well sealing material to form a composition having a high water loss value, said dry mixture consisting essentially of, a colloidal attapulgite clay, a material selected from the group consisting of hydratable MgO and Mg(OH)$_2$ in amount within the range of about 1% to 5%, expressed as MgO, based on the weight of said clay, 20% V.M. clay basis, and minus 325 mesh particles of an inorganic filter aid material.

3. A composition for use in recovering lost circulation in drilling wells comprising a dry mixture adapted to be mixed with water and well sealing material to form a composition having a high water loss value, said dry mixture comprising, colloidal attapulgite clay, a material selected from the group consisting of hydratable MgO and Mg(OH)$_2$ in amount within the range of about 1% to 5%, expressed as MgO, based on the weight of said clay, 20% V.M. clay basis, and minus 325 mesh particles of a filter aid material in amount within the range of about ⅓ to 1½ times the weight of said clay, said filter aid material being selected from the group consisting of diatomaceous earth, expanded perlite and colloidal attapulgite clay which has previously been dispersed in water in the presence of a deflocculating agent, dried quiescently and then calcined, said composition being free from water loss reducing agent.

4. A composition for use in recovering lost circulation in drilling wells comprising a dry mixture adapted to be mixed with water and well sealing material to form a composition having a high water loss value, said dry mixture comprising, colloidal attapulgite clay, a material selected from the group consisting of hydratable MgO and Mg(OH)$_2$ in amount within the range of about 1% to 5%, expressed as MgO, based on the weight of said clay, 20% V.M. clay basis, and minus 325 mesh particles of a filter aid material in amount within the range of about ⅓ to about 1½ times the weight of said clay, said filter aid material being selected from the group consisting of diatomaceous earth, expanded perlite and colloidal attapulgite clay which has previously been dispersed in water in the presence of a deflocculating agent, dried quiescently and then calcined, said composition being substantially free from swelling bentonite clay and from water loss reducing agent.

6. A dry mixture for use in recovering lost circulation in drilling wells comprising,
about equal weight proportions of colloidal attapulgite clay and minus 325 mesh particles of siliceous filter aid,
and hydratable MgO in amount within the range from about 1% to about 5%, based on the weight of said clay, 20% V.M. clay basis,
said mixture being substantially free from swelling bentonite clay and from water loss reducing agent.

7. A dry mixture for use in recovering lost circulation in drilling wells comprising,
about 80 parts by weight of colloidal attapulgite clay containing about 3% by weight of hydratable MgO additive, based on the weight of said clay, 20% V.M. clay basis,
and about 100 parts by weight of diatomaceous earth filter aid.

8. A high water loss composition for use in recovering lost circulation in drilling wells comprising an aqueous pumpable mixture of,
a mud forming quantity of colloidal attapulgite clay,
a material selected from the group consisting of hydratable MgO and Mg(OH)$_2$ in amount within the range of about 1% to 5%, expressed as MgO, based on the weight of said clay, 20% V.M. clay basis,
about 6 to 18 pounds per barrel of mixture of a powdered inorganic filter aid material selected from the group consisting of diatomaceous earth, expanded perlite and colloidal attapulgite clay which has previously been dispersed in water in the presence of a deflocculating agent, dried quiescently and then calcined,
and sealing material, said composition being free from water loss reducing agent.

9. A high water loss composition for use in recovering lost circulation in drilling wells comprising an aqueous pumpable mixture of,
a mud forming quantity of colloidal attapulgite clay,
MgO in amount within the range of about 1% to 5% of the weight of said clay, 20% V.M. clay basis.
about 6 to 18 pounds per barrel of mixture of a powdered inorganic filter aid material selected from the group consisting of diatomaceous earth, expanded perlite and colloidal attapulgite clay which has previously been dispersed in water in the presence of a deflocculating agent, dried quiescently and then calcined,
a weighing agent,
and fibrous sealing material,
said composition being substantially free from swelling bentonite clay.

10. A high water loss composition adapted for use in recovering lost circulation in drilling wells comprising an aqueous pumpable mixture of,
colloidal attapulgite clay in amount within the range of about 6 to 15 pounds per barrel of mixture,
hydratable MgO in amount of about 1% to 5%, based on the weight of said clay, 20% V.M. clay basis,
a finely divided filter aid material in amount of about 6 to 18 pounds per barrel of mixture,
and a seal-forming quantity of sealing agent,
said composition being substantially free from water loss reducing agents and being substantially free from swelling bentonite clay.

11. A high water loss composition for use in recovering lost circulation in drilling wells comprising an aqueous pumpable mixture of,
colloidal attapulgite clay containing 3% by weight of hydratable MgO additive, based on the weight of said clay, 20% V.M. clay basis, in amount within the range of about 8 to 10 pounds per barrel of mixture,
diatomaceous earth filter aid in amount of about 8 to 10 pounds per barrel of mixture,
and a seal-forming quantity of particulate fibrous sealing agent,
said composition being substantially free from water loss reducing agents and being substantially free from swelling bentonite clay.

12. A method for recovering lost circulation in a drilling well which comprises pumping a high water loss mud into a well under pressure in amount sufficient to cover a lost circulation zone of the well formation, whereby a thick water-permeable cake is rapidly deposited on the face of said lost circulation zone as a result of loss of water from said high water loss mud,
said cake being adapted for deposition thereon of a mud cake resistant to water and fluid loss upon introduction of circulating fluid thereto,
said high water loss mud comprising an aqueous dispersion of colloidal attapulgite clay containing a small quantity of a material selected from the group consisting of hydratable MgO and Mg(OH)$_2$, and having suspended therein sealing material and minus 325 mesh particles of a material selected from the group consisting of diatomaceous earth, expanded perlite and colloidal attapulgite clay which has previously been dispersed in water in the presence of a deflocculating agent, dried quiescently and then calcined.

13. A method for recovering lost circulation in a drilling well which comprises,
discontinuing the circulation of rotary drilling mud into a drilling well having a lost circulation zone in the formation,
pumping into the well under pressure a high water loss mud in amount sufficient to cover the lost circulation zone of the formation, whereby a dense water-permeable cake is deposited rapidly on the face of said lost circulation zone as a result of the seepage of water through deposited solids of said high water loss mud,
and then resuming flow of a circulating drilling mud into the well thereby to deposit on said cake a mud sheath resistant to water loss,
said high water loss mud comprising:
a mud forming quantity of colloidal attapulgite clay dispersed in an aqueous liquid,
said liquid containing hydratable MgO in amount of about 1% to 5%, based on the weight of said clay, 20% V.M. clay basis,
minus 325 mesh particles of an inorganic filter aid material and
particles of a sealing agent.

14. A method for recovering lost circulation in a drilling well which comprises,
discontinuing the flow of circulating drilling mud into a drilling well having a faulty zone causing loss of said drilling mud,
pumping into the well under pressure a high water loss mud in amount sufficient to cover said faulty zone, whereby a dense water-permeable cake is rapidly deposited on the face of said faulty zone as a result of loss of water from said high water loss mud,
and then resuming the flow of circulating drilling mud into the well thereby to deposit on said cake a mud sheath resistant to water loss,
said high water loss mud comprising:
an aqueous dispersion of colloidal attapulgite clay containing about 1% to 5% of MgO, based on the weight of said clay, 20% V.M. clay basis, said clay being present in amount of about 8 to 12 pounds per barrel of said high water loss mud,
a weighting agent,
sealing agent,
and about 8 to 12 pounds per barrel of said high water loss mud of minus 325 mesh particles of a material selected from the group consisting of diatomaceous earth, expanded perlite and colloidal attapulgite clay which has previously been dispersed in water in the presence of a deflocculating agent, dried quiescently and then calcined.

References Cited by the Examiner

UNITED STATES PATENTS

| 1,806,471 | 5/31 | Kramer | 210—503 |
| 1,981,877 | 11/34 | Pierce | 210—502 |
| 2,665,259 | 1/54 | Buffett | 252—457 |
| 3,046,221 | 7/62 | Dodd | 252—8.5 |

OTHER REFERENCES

Ruffin, D. R., New Squeeze for Lost Circulation; in the Oil and Gas Journal, vol. 55, pp. 67–97, October 28, 1957.

CHARLES E. O'CONNELL, *Primary Examiner.*